(12) United States Patent
He

(10) Patent No.: US 10,507,383 B2
(45) Date of Patent: Dec. 17, 2019

(54) INFORMATION PROCESSING METHOD AND APPARATUS, ELECTRONIC DEVICE, AND STORAGE MEDIUM

(71) Applicant: NETEASE (HANGZHOU) NETWORK CO., LTD, Zhejiang (CN)

(72) Inventor: Zhaoda He, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/106,076

(22) Filed: Aug. 21, 2018

(65) Prior Publication Data

US 2019/0070496 A1 Mar. 7, 2019

(30) Foreign Application Priority Data

Sep. 1, 2017 (CN) .......................... 2017 1 0780573

(51) Int. Cl.
*A63F 13/00* (2014.01)
*A63F 13/2145* (2014.01)
(Continued)

(52) U.S. Cl.
CPC ........ *A63F 13/2145* (2014.09); *A63F 13/426* (2014.09); *A63F 13/537* (2014.09);
(Continued)

(58) Field of Classification Search
None
See application file for complete search history.

(56) References Cited

U.S. PATENT DOCUMENTS

| 8,675,019 B1 * | 3/2014 | Feinstein ............... G09G 5/026 |
| | | 345/634 |
| 2005/0110768 A1 * | 5/2005 | Marriott .............. G06F 3/03547 |
| | | 345/173 |

(Continued)

FOREIGN PATENT DOCUMENTS

CN 101841910 A 9/2010
CN 105094345 A 11/2015
(Continued)

OTHER PUBLICATIONS

Search reports for CN Priority application No. 201710780573.4 filed on Sep. 1, 2017, dated Jun. 20, 2018 and dated Sep. 4, 2018.

*Primary Examiner* — Paul A D'Agostino
(74) *Attorney, Agent, or Firm* — Gang Yu

(57) ABSTRACT

An information processing method and apparatus, an electronic device, and a storage medium are provided. The method includes: a touch area is provided on a graphical user interface, and a virtual character is configured to move in a game scene according to a first touch operation in the touch area; when a second touch operation of which a starting touch point is in the at least one signal icon is detected, a position of a current touch point of the second touch operation is detected in real time; when the position of the current touch point satisfies a preset condition, a mini-map is provided on the graphical user interface; and when the end of the second touch operation is detected, and a position of an ending touch point of the second touch operation is in the mini-map, a prompt signal corresponding to at least one signal icon is sent, the prompt signal including position indication information of the game scene.

19 Claims, 2 Drawing Sheets

(51) Int. Cl.
  *A63F 13/5375* (2014.01)
  *A63F 13/5378* (2014.01)
  *G06F 3/0481* (2013.01)
  *G06F 3/0484* (2013.01)
  *G06F 3/0488* (2013.01)
  *A63F 13/426* (2014.01)
  *A63F 13/537* (2014.01)
  *A63F 13/92* (2014.01)
  *A63F 13/54* (2014.01)

(52) U.S. Cl.
  CPC ...... *A63F 13/5375* (2014.09); *A63F 13/5378* (2014.09); *A63F 13/54* (2014.09); *A63F 13/92* (2014.09); *G06F 3/0488* (2013.01); *G06F 3/04817* (2013.01); *G06F 3/04845* (2013.01); *G06F 3/04886* (2013.01)

(56) References Cited

U.S. PATENT DOCUMENTS

| | | | | |
|---|---|---|---|---|
| 2007/0238529 | A1* | 10/2007 | Iwamoto | H04W 4/60 463/42 |
| 2008/0146328 | A1* | 6/2008 | Ishii | A63F 13/10 463/31 |
| 2011/0256912 | A1* | 10/2011 | Baynes | A63F 13/803 463/6 |
| 2011/0273473 | A1* | 11/2011 | Kim | G06T 19/00 345/629 |
| 2012/0007854 | A1* | 1/2012 | Cho | G06F 3/04883 345/419 |
| 2012/0194461 | A1* | 8/2012 | Lim | G06F 3/03547 345/173 |
| 2012/0223894 | A1* | 9/2012 | Zhao | G06F 3/0488 345/173 |
| 2013/0127980 | A1* | 5/2013 | Haddick | G06F 3/013 348/14.08 |
| 2014/0143732 | A1 | 5/2014 | Haussila et al. | |
| 2014/0191977 | A1* | 7/2014 | Feng | G06F 3/018 345/173 |
| 2014/0243089 | A1* | 8/2014 | Tsukioka | A63F 13/12 463/31 |
| 2014/0245367 | A1* | 8/2014 | Sasaki | H04N 21/4402 725/109 |
| 2014/0368441 | A1* | 12/2014 | Touloumtzis | G06F 3/017 345/173 |
| 2014/0379946 | A1* | 12/2014 | Zhang | G06F 3/038 710/67 |
| 2016/0059131 | A1* | 3/2016 | Ye | A63F 13/537 463/31 |

FOREIGN PATENT DOCUMENTS

| | | |
|---|---|---|
| CN | 105260100 A | 1/2016 |
| CN | 105597310 A | 5/2016 |
| CN | 106453638 A | 2/2017 |
| CN | 106975219 A | 7/2017 |
| CN | 107019909 A | 8/2017 |
| CN | 107096226 A | 8/2017 |

* cited by examiner

INFORMATION PROCESSING METHOD AND APPARATUS, ELECTRONIC DEVICE, AND STORAGE MEDIUM

The present disclosure claims priority of Chinese Patent Application No. 201710780573.4, filed on Sep. 1, 2017 and named after "Information Processing Method and Apparatus, Electronic Device, and Storage Medium". Contents of the present disclosure are hereby incorporated by reference in entirety of the Chinese Patent Application.

TECHNICAL FIELD

The present disclosure relates to the technical field of games, and in particular to an information processing method and apparatus, an electronic device, and a storage medium.

BACKGROUND

With development of intelligent mobile terminals and game industry, a lot of mobile games with different themes emerge to meet requirements of players. Multiple players in groups for battle in games may be a core gameplay for many mobile games. For example, the core gameplay for Multi-player Online Battle Arena (MOBA) mobile games is 5V5 group battle. In a process of players in groups for battle in the game, communication and cooperation among the players are crucial. Therefore, whether a convenient and rapid interaction mechanism can be provided for communication among the players or not is an important influencing factor on player experience in such a type of mobile games.

In view of the above problems, no effective solution has yet been proposed.

SUMMARY

At least one embodiment of the present disclosure provides an information processing method and apparatus, an electronic device, and a storage medium, so as at least to partially solve technical problems that at least one position cannot be conveniently specified and at least one operation is incoherent and inconvenient in a triggering interaction mode of a prompt signal generated in a game of a mobile terminal.

In an embodiment of the present disclosure, an information processing method is applied to a mobile terminal having at least one processor for executing a software application and a touch screen which is rendered with a graphical user interface. Contents rendered on the graphical user interface include a game scene, a virtual character and at least one signal icon. The method includes that:

providing a touch area on the graphical user interface, and configuring the virtual character to move in the game scene according to a first touch operation in the touch area; when a second touch operation of which a starting touch point is in the at least one signal icon is detected, detecting a position of a current touch point of the second touch operation in real time; when the position of the current touch point satisfies a preset condition, providing a mini-map on the graphical user interface; and when the end of the second touch operation is detected, and a position of an ending touch point of the second touch operation is in the mini-map, sending a prompt signal corresponding to the at least one signal icon, the prompt signal including position indication information of the game scene.

In another embodiment of the present disclosure, an information processing apparatus is applied to a mobile terminal having at least one processor for executing a software application and a touch screen which is rendered with a graphical user interface. Contents rendered on the graphical user interface include a game scene, a virtual character and at least one signal icon. The apparatus includes:

an interaction element, configured to provide a touch area on the graphical user interface, and configure the virtual character to move in the game scene according to a first touch operation in the touch area;

a detection element, configured to detect, when a second touch operation of which a starting touch point is in at least one signal icon is detected, a position of a current touch point of the second touch operation in real time;

a signal processing element, configured to provide, when the position of the current touch point satisfies a preset condition, a mini-map on the graphical user interface; and a signal sending element, configured to send, when the end of the second touch operation is detected, and a position of an ending touch point of the second touch operation is in the mini-map, a prompt signal corresponding to the at least one signal icon, the prompt signal including position indication information of the game scene.

In another embodiment of the present disclosure, a computer-readable storage medium is provided, on which at least one computer program may be stored, and the at least one computer program may be executed by at least one processor to implement the information processing method.

In another embodiment of the present disclosure, an electronic device is provided. The electronic device includes: at least one processor; and at least one memory, configured to store at least one executable instruction of the at least one processor, and the at least one processor is configured to execute the information processing method by executing the at least one executable instruction.

DETAILED DESCRIPTION

In order to make those skilled in the art better understand the solutions of the present disclosure, the technical solutions in the embodiments of the present disclosure will be described clearly and completely below with reference to the accompanying drawings in the embodiments of the present disclosure.

In the related art, a human-computer interaction designed for a player to send a communication signal mainly includes one of the following manners.

At a first manner, the communication signal is sent in a text input manner. Since text input may interrupt an operation in a game, this manner is suitable for a player in a non-battle state.

At a second manner, a preset signal is sent by providing a specific control. For example, a gather signal sending button is provided, and the gather signal sending button is configured for a player to send a gather prompt signal to other allies. However, the player cannot autonomously select a signal sending position, so that it is impossible for the player to notify an exact gather place to the other allies.

At a third manner, through detecting a click operation in a mini-map on a game interface, the player may send a communication signal. In such a manner, the player can autonomously select a position where the signal located in. However, the content of signal is preset, the player cannot select a type (such as, gather, attack and retreat) of the signal, and the type of the signal is automatically selected according to an algorithm of a system, so that a selection result is likely to be inconsistent with a real intention of the player. In addition, a screen of a mobile phone is relatively small, so that a position cannot be accurately selected from the mini-map in the game, and a mis-operation rate is high. If the mini-map is zoomed in to improve operation accuracy, a screen display area will be occupied, and the timely capture of battle information and game control of players are affected. For example, the zoomed-in mini-map will affect operations of the player on a virtual joystick.

In an embodiment of the present disclosure, an embodiment of an information processing method is provided. It should be noted that the steps shown in the flowchart of the drawings may be performed in a computer system such as a set of computer-executable instructions, and although a logical order is shown in the flowchart, in some cases, the illustrated or described steps may be performed in an order other than the above.

Figure 1:
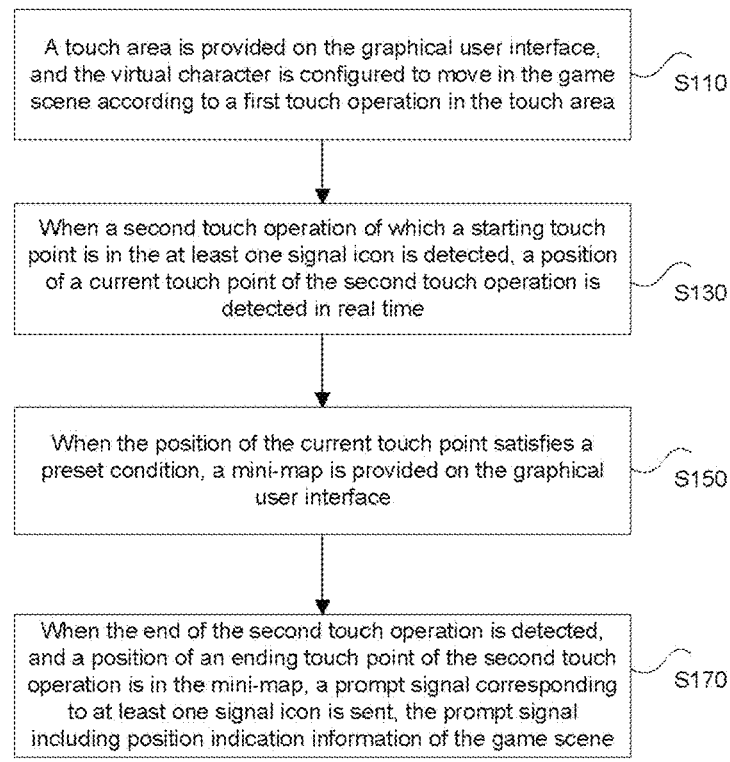
FIG. 1 is a flowchart of an information processing method according to an embodiment of the present disclosure.

FIG. 1 is a flowchart of an information processing method according to an embodiment of the present disclosure. The information processing method is applied to a mobile terminal having at least one processor for executing a software application and a touch screen which is rendered with a graphical user interface. Contents rendered on the graphical user interface include a game scene, a virtual character and at least one signal icon. As shown in FIG. 1, the method may include the steps as follows.

At step S110, a touch area is provided on the graphical user interface, and the virtual character is configured to move in the game scene according to a first touch operation in the touch area.

At step S130, when a second touch operation of which a starting touch point is ins at least one signal icon is detected, a position of a current touch point of the second touch operation is detected in real time.

At step S150, when the position of the current touch point satisfies a preset condition, a mini-map is provided on the graphical user interface.

At step S170, when the end of the second touch operation is detected, and a position of an ending touch point of the second touch operation is in the mini-map, a prompt signal corresponding to at least one signal icon is sent, the prompt signal including position indication information of the game scene.

With the information processing method in the present exemplary embodiment, on the one hand, position information can be sent without requiring a player to manually input a position; on the other hand, the number of operating steps during the game would be reduced. That is, the players only need to touch a signal icon with a finger, and slide the finger to a specified position, then lift the finger to complete signal sending at the specified position. Thus sending signal at the specified position can be triggered by one single hand. The operation is more coherent and simple, and the type of a signal can be selected, so that the availability and usability of signal sending are improved. In addition, in the process of sending the signal, the touch area on the left side is not blocked, the control of the virtual character by a player is not affected, and the game experience is enhanced. The information processing method in the present exemplary embodiment solves the technical problems that at least one position cannot be conveniently specified, and operation is incoherent and inconvenient in a triggering interaction mode of a prompt signal generated in a game of a mobile terminal.

Figure 2:
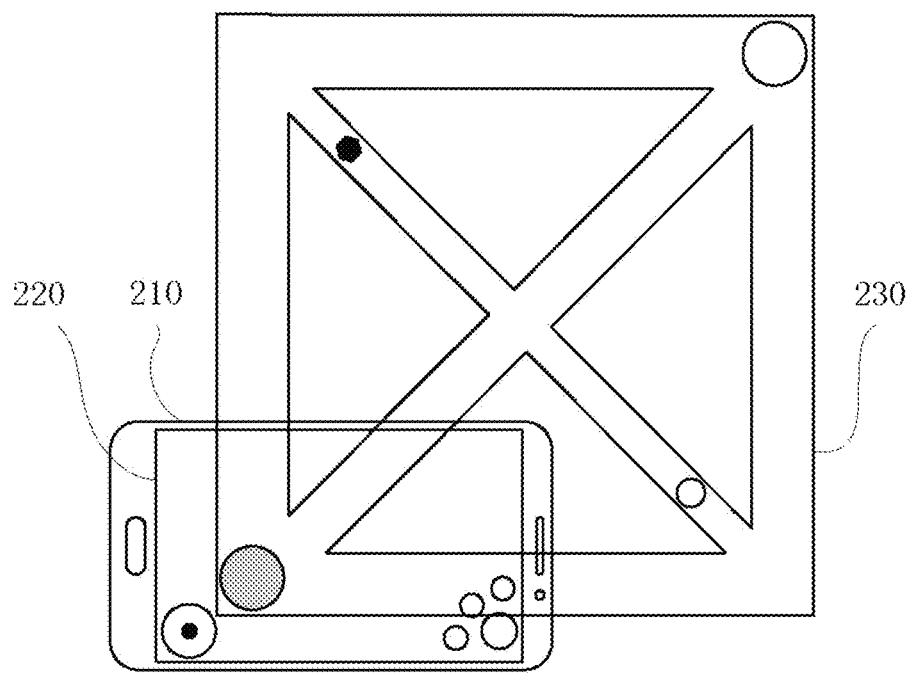
FIG. 2 is a schematic diagram of a game scene according to an embodiment of the present disclosure.

In the following, the steps of the information processing method in the present exemplary embodiment will be further described with reference to FIG. 2 to FIG. 4.

In the present exemplary embodiment, a software application is executed on a processor of a mobile terminal 200, and a graphical user interface 210 is rendered on a touch display screen of the mobile terminal 200. Contents rendered on the graphical user interface 210 include a game scene 220, a virtual character 230 and at least one signal icon.

Contents rendered on the graphical user interface 210 may include the entire part of the game scene 220, or part of the game scene 220. For example, as shown in FIG. 2, since the game scene 220 is relatively large, local content of the game scene 220 is displayed on the graphical user interface 210 of the mobile terminal 200 during a process of running the game.

Figure 3:
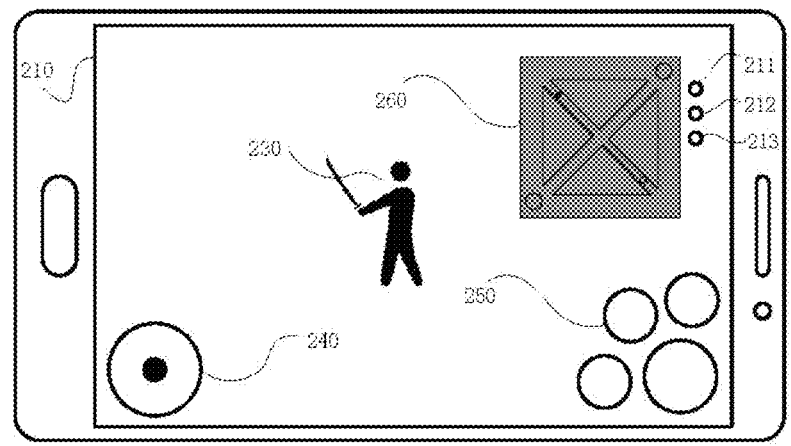
FIG. 3 is a schematic diagram of a graphical user interface of a mobile terminal according to an embodiment of the present disclosure.

The graphical user interface 210 includes at least one signal icon (e.g., signal icons 211, 212, 213 in FIG. 3). The at least one signal icon may be located at the upper left, upper right, or other positions of the graphical user interface 210. In addition, preset instruction information corresponding to the at least one signal icon may be set as default by a system, and may also be preset by a player. For example, the preset instruction information corresponding to the at least one signal icon may be "retreat", "gather", "attack", "be careful", and so on. The signal icons with different instruction information may be separately disposed on the graphical user interface 210, or may also be collapsed in one signal icon in a form of signal sub-icons, when the finger clicks on this one signal icon, the signal sub-icons with different instruction information are expanded. The number of signal icons, the arrangement positions, the arrangement mode, and the like are not specifically limited in the present exemplary embodiment.

At step S110, a touch area is provided on the graphical user interface, and the virtual character is configured to move in the game scene according to a first touch operation in the touch area.

A touch area 240 is provided on the graphical user interface 210. The touch area 240 may set as a visible area on the graphical user interface 210, or an invisible area. The touch area 240 may also be an operation area with a virtual joystick or a direction control virtual button. The present exemplary embodiment is not limited to displayed contents of the touch area.

In a specific embodiment of the present disclosure, the touch area 240 is a virtual joystick control area. The virtual joystick control area is located at the lower left of the graphical user interface 210. The virtual character 230 is controlled to perform at least one of movement and turning around in the game scene 220 according to a touch operation in the virtual joystick control area.

It can be understood that in other embodiments, the touch area 240 may also be a virtual cross button area or a virtual D-PAD area. The virtual character 230 is controlled to perform at least one of movement and turning around in the game scene 220 according to a touch operation in the virtual cross button area.

As an optional embodiment, the touch area 240 is a visible area on the graphical user interface 210. For example, the touch area 240 may have a boundary frame, or be rendered with color or predetermined transparency, or adopt other modes to distinguish the touch area 240 visually. The virtual character 230 is controlled to perform at least one of movement and turn around in the game scene 220 according to a touch operation such as sliding and clicking in the touch area 240. The visible touch area 240 can be positioned quickly by players, and an operation difficulty of a game novice can be reduced.

As another optional embodiment, the touch area 240 may be set as an invisible area on the graphical user interface 210. Thus the touch area 240 would not cover or affect the game screen, it can save the screen space and provide a better picture effect. However, since the invisible touch area is hard to be sensed by a player. As an optional implementation solution, a visual guide control may be displayed in the touch area 240. For example, in an embodiment of the present disclosure, when a virtual joystick is used as a direction control solution of a virtual character 230, the virtual joystick may be displayed in the touch area 240 to visually guide the player.

For convenience of operation, a plurality of skill icons 250 may also be provided on the graphical user interface 210 for providing the player with a control function of casting skills. The skill icons 250 are disposed at the lower right of the graphical user interface 210. The virtual character 230 is controlled by the left hand to be moved and turned around in the game scene 220, and the skills of the virtual character 230 are sent by controlling the skill control 250 by the right hand. The skills corresponding to the skill icons 250 may be attack skills (e.g., skills that is capable of reducing Health Points (HP) value of at least one virtual enemy character), HP value recovering skills (e.g., skills that is capable of recovering HP value of at least one virtual ally character), and freezing skills (e.g., skills enabling at least one virtual enemy character to be motionless or sluggish). In addition, skills corresponding to the skill icons 250 may be targeting skills, or non-targeting skills(click to cast). After the skill icon 250 is touched, a virtual joystick for controlling a skill position or direction may be generated in the center of the skill icon 250, or at the position of a starting touch point of the touch operation. The user may control the virtual joystick by sliding to set the skill position or direction, and cast at least one skill when the user finishes touching.

At step S130, when a second touch operation of which a starting touch point is in at least one signal icon is detected, a position of a current touch point of the second touch operation is detected in real time.

In the present embodiment, when a second touch operation of which a starting touch point is in a signal icon 211 is detected, a position of a current touch point of the second touch operation is detected in real time. For example, a sliding touch operation in the signal icon 211 executed by at least one finger of a player is detected. When detecting such the sliding touch operation, a position of a current touch point of the sliding touch operation is detected in real time.

In an optional embodiment, when detecting a second touch operation of which a touch point passes through the signal icon 211, a position of a current touch point of the second touch operation is detected in real time. That is, a starting point of the touch operation is not necessarily in the area of the signal icon 211, but a current touch point is located in the area of the signal icon 211 during the second touch operation.

At step S150, when the position of the current touch point satisfies a preset condition, a mini-map is provided on the graphical user interface.

As shown in FIG. 3, when the position of the current touch point satisfies the preset condition, a mini-map 260 is provided on the graphical user interface. The mini-map 260 may be provided by determining whether the position of the current touch point satisfies the preset condition, if the position of the current touch point satisfies the preset condition, then the mini-map 260 is provided, so as to avoid displaying the mini-map if it does not meet the intention of the user.

In a specific embodiment of the present disclosure, the preset condition is that: the position of the current touch point is in an activation response area. Specifically, when the position of the current touch point is detected in an activation response area, a mini-map 260 is provided on the graphical user interface 210. For example, when the position of the current touch point is is detected in the activation response area, that is, a position of a signal icon 211 is a position P1, a player touches the signal icon 211 with a finger, and then moves the finger from the position P1 to a position P2. When the position P2 is in the area of the activation response area, the mini-map 260 is provided at the upper right of the graphical user interface 210. At this time, if the player wants to cancel the operation, just moves the finger out of the mini-map 260. When the finger touches the signal icon 211, or the finger moves a smaller distance after touching the signal icon 211 and the position of the current touch point is outside the activation response area after the movement, the operation executed by the finger may be regarded as a click operation, so as to directly send a signal. The position of the signal is the position of the virtual character 230 in the game scene, so as to ensure the coherence of the operation.

In the present embodiment, for ease of operation, the area of the mini-map 260 covers the area of the activation response area. It can be understood that in other embodiments, the area of the mini-map 260 may be covered by the area of the activation response area, or may be not overlapped with the area of the activation response area.

As an optional embodiment, the preset condition is that: the position of the current touch point is located in a signal icon. Specifically, when the position of the current touch point located in the signal icon 211 is detected, a mini-map 260 is provided on the graphical user interface 210. For example, when the position of the current touch point in the signal icon 211 is detected, that is, when detecting the finger of the player clicks on or long-presses the signal icon 211, a mini-map 260 is provided on the graphical user interface 210. At this time, if the player wants to cancel the operation or hide the mini-map, just clicks the signal icon 211 again, or clicks in a certain position outside the mini-map 260.

The mini-map may be a thumbnail of the entire game scene (e.g., 260 in FIG. 3), or may be a thumbnail of a local part of the game scene. A touch operation is performed in the thumbnail to intuitively select at least one of object and position needing to be indicated. Moreover, position information in the mini-map 260 is in a one-to-one mapping relationship with position information in the game scene 220. Different details may be displayed in the mini-map 260 for different types of games (e.g., details of maps that may be used to assist players in determining positions of virtual characters controlled by the players in the game world, real-time positions of ally characters, real-time positions of enemy characters, vision information of a current game scene, etc.). In an optional embodiment, the mini-map 260 is generated within a preset range spaced from at least one signal icon. In this way, a player can conveniently and coherently select the position to be indicated by performing the touch operation within a small range.

At step S170, when the end of the second touch operation is detected, and a position of an ending touch point of the second touch operation is in the mini-map, a prompt signal corresponding to at least one signal icon is sent, the prompt signal including position indication information of the game scene.

For example, a current touch point of a second touch operation (e.g., a sliding touch operation) is located in the mini-map 260. If a touch object (e.g., a finger or a touch pencil) leaves a touch screen at this time, the current touch point is the ending touch point of the touch operation. In this way, the position of the ending touch point of the touch operation in the mini-map 260 is detected, and a prompt signal corresponding to the signal icon is sent (e.g., attacking, retreating, etc.), the prompt signal including the position indication information of the game scene.

The function of the prompt signal is used for prompting other players in the game (e.g., allies in a team game). Therefore, the prompt signal may be sent to allies through a game server, so that a corresponding signal is displayed on the graphical user interface 210 of each of the allies' device. Of course, corresponding signals may also be displayed on the graphical user interfaces 210 of all allies' or all players' devices.

Figure 4:
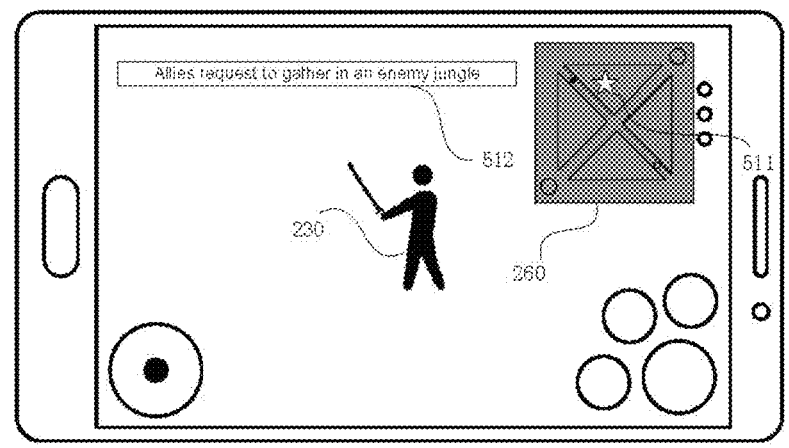
FIG. 4 is a display schematic diagram of a prompt signal according to a first exemplary embodiment of the present disclosure.

In an optional embodiment, after sending the prompt signal, a position of a game scene indicated by the position indication information of the game scene is identified in the mini-map 260, as position 511 shown in FIG. 4.

In an optional embodiment, when a prompt signal sent by other terminals is received, a position of a game scene indicated by the position indication information of the game scene is identified in the mini-map 260, as position 511 shown in FIG. 4.

In an optional embodiment, the position indication information of the game scene includes position information in the game scene corresponding to the position of the ending touch point of the second touch operation.

For example, a position of an ending touch point in a mini-map is a point A. According to a corresponding relationship between the mini-map and the game scene, a position point B may be determined in the game scene. Position indication information of the game scene includes position indication information of the point B (it should be noted that the position indication information of the point B may be coordinates of the point B in the game scene, or coordinates of the point A corresponding to the point B in the mini-map, or other position indication information capable of directly or indirectly indicating the position of the point B). Or, a position of an ending touch point in a mini-map is a point A. According to a corresponding relationship between the mini-map and a game scene, a position point B may be determined in the game scene, the point B is located in a specific area C (e.g., a jungle C) in the game scene, and the position indication information of the game scene includes the position indication information of the specific area C.

It can be understood that in order to avoid an occlusion problem of a current game screen, in an optional embodiment, the mini-map 260 is hidden after the corresponding prompt signal is sent.

Further, in order to facilitate the player to intuitively determine the position of the prompt signal in the game scene 220, a mini-map 270 may be provided at the upper left of the graphical user interface 210. The mini-map 270 is a thumbnail of the entire game scene, and the position information of the mini-map is in a one-to-one mapping relationship with position information in the game scene 220. Specifically, after the corresponding prompt signal is sent, the mini-map 260 is hidden, and the prompt signal is displayed on the mini-map 270 in a visible manner.

In an optional embodiment, a player terminal receiving the prompt signal identifies a corresponding position in the mini-map 270 according to the position indication, so that the player can intuitively determine the position indicated by the prompt signal through a visual indicator on a panoramic thumbnail of the game scene. The visual indicator is exemplary to be a dynamic effect such as a flashing highlighting prompt. As an optional embodiment, after the local terminal sends the prompt signal, the position indicated by the prompt signal may also be identified in the mini-map 270, so that the player can obtain a good operation feedback.

Figure 5:
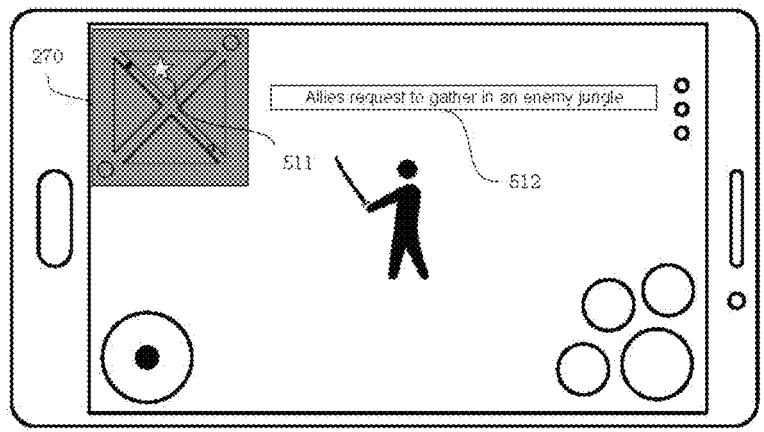
FIG. 5 is a display schematic diagram of a prompt signal according to a second exemplary embodiment of the present disclosure.

It can be understood that in addition to the position indication information, the prompt signal may also include signal content information, which may be at least one of voice prompt information, text prompt information (e.g., 512 in FIG. 5) and pattern prompt information. The signal content may include "attack", "retreat", "defense", "guard", "gather" or the like. For example, a reminding voice may be sent to terminals of other players (e.g., when a user selects "gather", audio information "gather" of voice reminding is sent to the terminals of other players), and voice reminding indication information may also be sent to the terminals of other players to indicate the terminals of other players to play the corresponding and pre-stored voice audio.

With the signal processing method that is provided by the present disclosure and is quick, convenient, accurate and effective, it is possible to realize sending of a custom position in a game scene. Meanwhile, the operation steps in the game process can be reduced. That is, a player touches the signal icon to trigger by a finger and then moves the finger to control a position indicator in a mini-map to move to a specified position, leaves the finger to complete signal sending at the specified position. The signal processing method solves the technical problem that a signal sending mode is single and a custom position cannot be accurately provided in a mobile terminal game.

FIG. 3 and FIG. 4 are used below to illustrate the operation and corresponding response of a player sending a prompt signal during execution of the method according to an optional embodiment of the present disclosure. A software application is executed on a processor of a mobile terminal 200, and a graphical user interface 210 is rendered on a touch display screen of the mobile terminal 200. Contents rendered on the graphical user interface 210 include a game scene 220, a virtual character 230, a mini-map 270 and signal icons 211, 212, 213. The signal icon 211 is taken as an example. For example, the signal icon 211 includes text and voice information with the content "initiating an attack".

When the finger leaves the signal icon 211 immediately after touching, a text and voice signal of "initiating an attack" is directly sent. The position of the signal is the position in the game scene where the virtual character 230 is located.

After the player touches the signal icon 211 with a finger, then moves the finger from a position P1 where a signal icon A is located to a position P2, and the position P2 is in an activation response area. At this time, a mini-map 260 is generated at the upper right of the graphical user interface 210. The area of the mini-map 260 covers the area of the activation response area.

When the position of the ending touch point of the touch operation is detected in the mini-map 260, that is, when the finger of the player leaves the mini-map 260, a prompt signal corresponding to the signal icon is sent, the prompt signal including position indication information of the game scene. Meanwhile, the mini-map 260 is hidden. At this time, "initiating an attack" is displayed at a position corresponding to the position indication information of the game scene in the mini-map 270, and a voice is prompted.

When the player wants to cancel the signal sending operation, it is necessary to slide the finger out of the mini-map 260.

In another embodiment of the present disclosure, an information processing apparatus is also applied to a mobile terminal having at least one processor for executing a software application and a touch screen which is rendered with a graphical user interface. Contents rendered on the graphical user interface include a game scene, a virtual character and at least one signal icon. The apparatus includes:

an interaction element, configured to provide a touch area on the graphical user interface, and configure the virtual character to move in the game scene according to a first touch operation in the touch area;

a detection element, configured to detect, when a second touch operation of which a starting touch point is in at least one signal icon is detected, a position of a current touch point of the second touch operation in real time;

a signal processing element, configured to provide, when the position of the current touch point satisfies a preset condition, a mini-map on the graphical user interface; and a signal sending element, configured to send, when the end of the second touch operation is detected, and a position of an ending touch point of the second touch operation is in the mini-map, a prompt signal corresponding to the at least one signal icon, the prompt signal including position indication information of the game scene.

The specific details of the elements in the information processing apparatus have been described in detail in the corresponding information processing method, and therefore will not be described here.

It should be noted that although several components or elements of the device for action execution are mentioned in the above detailed description, such division is not mandatory. In fact, according to the implementation manners of the present disclosure, the features and functions of two or more components or elements described above may be embodied in one component or element. Conversely, the features and functions of one component or element described above may be further divided into multiple components or elements and embodied.

In another embodiment of the present disclosure, a computer-readable storage medium is also provided. A program product capable of implementing the above method of the present specification is stored thereon. In some possible implementation manners, various aspects of the present disclosure may also be implemented in the form of a program product, which includes at least one program code for causing a terminal device to execute the steps according to various exemplary implementation manners of the present disclosure described in the "Exemplary Method" section of the present specification when the program product runs on a terminal device. It may use a portable Compact Disc Read-Only Memory (CD-ROM) and include a program code, and may run on a terminal device such as a personal computer. However, the program product of the present disclosure is not limited thereto, and in this document, the readable storage medium may be any tangible medium that contains or stores a program. The program may be used by or in conjunction with an instruction execution system, device, or apparatus.

The program product may employ any combination of one or more readable media. The readable medium may be a readable signal medium or a readable storage medium. The readable storage medium may be, for example but not limited to, an electrical, magnetic, optical, electromagnetic, infrared, or semiconductor system, apparatus, or device, or any combination of the above. More specific examples (non-exhaustive listings) of the readable storage medium include: electrical connectors with one or more wires, portable disks, hard disks, Random Access Memories (RAMs), ROMs, Erasable Programmable Read-Only Memories (EPROMs or flash memories), optical fibers, portable CD-ROMs, optical storage devices, magnetic storage devices, or any suitable combination of the above.

In another embodiment of the present disclosure, an electronic device is also provided. The electronic device includes: a processing component, which may further include at least one processor, and a memory resource represented by at least one memory and configured to store at least one instruction executable by the processing component, such as at least one application program. The at least one application program stored in the memory may include at least one component each corresponding to a set of instructions. In addition, the processing component is configured to execute instructions to perform the above-described information processing method.

The electronic device may also include: a power supply component, configured to perform power management on the executed electronic device; a wired or wireless network interface, configured to connect the electronic device to a network; and an input output (I/O) interface. The electronic device may operate based on an operating system stored in a memory, such as Android, iOS, Windows, Mac OS X, Unix, Linux, FreeBSD, or the like.

The sequence numbers of the foregoing embodiments of the present disclosure are merely for description and do not represent the advantages and disadvantages of the embodiments.

Apparently, the described embodiments are merely a part of the embodiments of the present disclosure, not all of the embodiments. On the basis of the embodiments of the present disclosure, all other embodiments obtained on the premise of no creative work of those skilled in the art fall within the protection scope of the present disclosure.

It should be noted that the specification and claims of the present disclosure and terms "first", "second", etc. in the foregoing drawings are used for distinguishing similar objects rather than describing a specific sequence or a precedence order. It will be appreciated that the terms used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

In the foregoing embodiments of the present disclosure, the description of each embodiment has its own emphasis. For the part not described in detail in one embodiment, reference may be made to the relevant description of other embodiments.

In some embodiments provided by the present disclosure, it shall be understood that the disclosed technical content may be implemented in other modes. For example, the apparatus embodiment described above is schematic. For example, the division of the components or elements is the division of logical functions, and there may be additional division modes during practical implementation. For example, a plurality of elements or assemblies may be combined or integrated to another system, or some characteristics may be omitted or may be not executed; and in addition, displayed or discussed mutual coupling or direct coupling or communication connection may be performed via some interfaces, and indirect coupling or communication connection between apparatuses or elements may be in an electrical form, a mechanical form or other forms.

The elements illustrated as separate components may be or may not be physically separated. Components for element display may be or may not be physical elements. That is, the components may be located at a place or may be distributed on a plurality of network elements. The aims of the solutions of the embodiments may be achieved by selecting some or all elements according to actual requirements.

In addition, all function elements in all embodiments of the present disclosure may be integrated in a processing element, or each element may exist separately and physically, or two or more elements may be integrated in an element. The integrated element may be implemented in a hardware form or may be implemented in a software function element form.

If the integrated element is implemented in the form of a software function element and is sold or used as an independent product, the product may be stored in a computer-readable storage medium. Based on this understanding, the technical solutions of the present disclosure may be substantially embodied in the form of a software product or parts contributing to the traditional art or all or some of the technical solutions may be embodied in the form of a software product, and a computer software product is stored in a storage medium, including a plurality of instructions enabling a computer device (which may be a personal computer, a server or a network device) to execute all or some of the steps of the method according to each embodiment of the present disclosure.

The above are exemplary implementation manners of the present disclosure, and it should be pointed out that those of ordinary skill in the art can also make several improvements and modifications without departing from the principle of the present disclosure. These improvements and modifications should also be regarded as the scope of protection of the present disclosure.

What is claimed is:

1. An information processing method, applied to a mobile terminal having at least one processor for executing a software application and a touch screen which is rendered with a graphical user interface, contents rendered on the graphical user interface comprising a game scene, a virtual character and at least one signal icon, the method comprising:
   providing a touch area on the graphical user interface, and configuring the virtual character to move in the game scene according to a first touch operation in the touch area;
   when a second touch operation of which a starting touch point is in the at least one signal icon is detected, detecting a position of a current touch point of the second touch operation in real time;
   when the position of the current touch point satisfies a preset condition, providing a mini-map on the graphical user interface; and
   when the end of the second touch operation is detected, and a position of an ending touch point of the second touch operation is in the mini-map, sending a prompt signal corresponding to the at least one signal icon, the prompt signal comprising position indication information of the game scene.

2. The information processing method as claimed in claim 1, further comprising:
   after sending the prompt signal, identifying a position of the game scene indicated by the position indication information of the game scene in the mini-map.

3. The information processing method as claimed in claim 1, further comprising:
   when the prompt signal sent by other terminals is received, identifying a position of the game scene indicated by the position indication information of the game scene in the mini-map.

4. The information processing method as claimed in claim 1, further comprising:
   after sending the prompt signal, hiding the mini-map.

5. The information processing method as claimed in claim 1, wherein the prompt information further comprises at least one of voice prompt information and text prompt information.

6. The method as claimed in claim 1, wherein the touch area is a virtual joystick control area.

7. The information processing method as claimed in claim 1, wherein the position indication information of the game scene comprises position information in the game scene corresponding to the position of the ending touch point of the second touch operation.

8. An information processing apparatus, applied to a mobile terminal having at least one processor for executing a software application and a touch screen which is rendered with a graphical user interface, contents rendered on the graphical user interface comprising a game scene, a virtual character and at least one signal icon, the apparatus comprising:
   an interaction element, configured to provide a touch area on the graphical user interface, and configure the virtual character to move in the game scene according to a first touch operation in the touch area;
   a detection element, configured to detect, when a second touch operation of which a starting touch point is in at least one signal icon is detected, a position of a current touch point of the second touch operation in real time;
   a signal processing element, configured to provide, when the position of the current touch point satisfies a preset condition, a mini-map on the graphical user interface; and a signal sending element, configured to send, when the end of the second touch operation is detected, and a position of an ending touch point of the second touch operation is in the mini-map, a prompt signal corresponding to the at least one signal icon, the prompt signal comprising position indication information of the game scene.

9. A computer-readable storage medium, on which at least one computer program is stored, wherein the at least one computer program is executed by at least one processor to implement the information processing method as claimed in claim 1.

10. An electronic device, comprising:
at least one processor; and
at least one memory, connected to the at least one processor, and configured to store at least one executable instruction of the at least one processor,
wherein the at least one processor is configured to execute the at least one executable instruction, the at least one executable instruction comprising:
providing a touch area on the graphical user interface, and configuring the virtual character to move in the game scene according to a first touch operation in the touch area;
when a second touch operation of which a starting touch point is in the at least one signal icon is detected, detecting a position of a current touch point of the second touch operation in real time;
when the position of the current touch point satisfies a preset condition, providing a mini-map on the graphical user interface; and
when the end of the second touch operation is detected, and a position of an ending touch point of the second touch operation is in the mini-map, sending a prompt signal corresponding to the at least one signal icon, the prompt signal comprising position indication information of the game scene.

11. The information processing method as claimed in claim 1, wherein contents rendered on the graphical user interface comprises one of the following: an entire part of the game scene, and a local part of the game scene.

12. The method as claimed in claim 1, wherein a plurality of signal icons corresponding to different instruction information are separately disposed on the graphical user interface; or, a plurality of sub-icons corresponding to different instruction information are collapsed in one signal icon.

13. The method as claimed in claim 1, wherein the touch area is a visible area.

14. The method as claimed in claim 1, wherein the touch area is an invisible area.

15. The method as claimed in claim 14, wherein a visual guiding control is displayed in the touch area.

16. The method as claimed in claim 1, wherein the preset condition is that the position of the current touch point is in an activation response area.

17. The method as claimed in claim 1, wherein the preset condition is that the position of the current touch point is located in the at least one signal icon.

18. The method as claimed in claim 1, wherein position information in the mini-map is in a one-to-one mapping relationship with position information in the game scene.

19. The method as claimed in claim 4, wherein after hiding the mini-map, the method further comprises:
displaying the prompt signal on the mini-map.

* * * * *